(12) United States Patent
Shinohara (10) Patent No.: US 10,766,434 B2
(45) Date of Patent: Sep. 8, 2020

(54) SIDE COWL TOP COVER

(71) Applicant: MORIROKU TECHNOLOGY COMPANY, LTD., Tokyo (JP)

(72) Inventor: Kenta Shinohara, Tokyo (JP)

(73) Assignee: MORIROKU TECHNOLOGY COMPANY, LTD., Tokyo (JP)

( * ) Notice: Subject to any disclaimer, the term of this patent is extended or adjusted under 35 U.S.C. 154(b) by 35 days.

(21) Appl. No.: 16/358,817

(22) Filed: Mar. 20, 2019

(65) Prior Publication Data

US 2019/0329722 A1     Oct. 31, 2019

(30) Foreign Application Priority Data

Apr. 26, 2018 (JP) ................................ 2018-085390

(51) Int. Cl.
  *B62D 25/08* (2006.01)
  *B60R 13/04* (2006.01)

(52) U.S. Cl.
  CPC ............ *B60R 13/04* (2013.01); *B62D 25/081* (2013.01)

(58) Field of Classification Search
  CPC ........ B62D 25/08; B62D 25/081; B60R 13/04
  USPC ......................................................... 296/192
  See application file for complete search history.

(56) References Cited

U.S. PATENT DOCUMENTS

| | | | | |
|---|---|---|---|---|
| 4,332,187 A * | 6/1982 | Imai | .................... | B60H 1/28 296/192 |
| 5,667,271 A * | 9/1997 | Booth | ................ | B60R 13/0206 24/295 |
| 8,491,043 B2 * | 7/2013 | Yamagishi | ........... | B62D 25/163 296/192 |
| 8,517,461 B2 * | 8/2013 | Huber | ................. | B62D 25/084 293/120 |
| 8,602,487 B2 * | 12/2013 | Tanaka | ................. | B62D 25/081 180/69.21 |
| 2007/0262615 A1 * | 11/2007 | Koizumi | ................ | B62D 25/08 296/201 |
| 2013/0076073 A1 * | 3/2013 | Tanaka | ................. | B62D 25/163 296/192 |
| 2016/0325697 A1 * | 11/2016 | Rogge | .................... | B60R 13/04 |
| 2019/0322227 A1 * | 10/2019 | Hiwatashi | ............... | B60R 13/04 |
| 2019/0329722 A1 * | 10/2019 | Shinohara | ............... | B60R 13/04 |
| 2020/0130610 A1 * | 4/2020 | Fujiki | ..................... | B60R 13/04 |

FOREIGN PATENT DOCUMENTS

JP     2011-098621     5/2011

* cited by examiner

*Primary Examiner* — Gregory A Blankenship
(74) *Attorney, Agent, or Firm* — Rankin, Hill & Clark LLP (57) ABSTRACT

A side cowl top cover includes a cover body and a hook formed so as to expand at an upper portion of the cover body in order to be engaged with the end flange. The cover body includes: a vertical wall that extends upwardly from a lower side of the windshield; and an extended portion extended from an upper end of the vertical wall toward the front fender. The hook includes: a holder placed at a predetermined gap relative to an end face of the extended portion and extended substantially in parallel with the end face of the extended portion; and a vertical rib extended in a direction intersecting with the direction in which the holder extends, and interconnecting a bottom surface of the extended portion and a bottom surface of the holder.

3 Claims, 10 Drawing Sheets

FIG.9C
DEMOLDING

FIG.9B
SLIDEING

FIG.9A
RESIN INJECTING

FIG.10
(PRIOR ART)

SIDE COWL TOP COVER

FIELD OF THE INVENTION

The present disclosure relates to a side cowl top cover applied for vehicles, such as automobiles.

BACKGROUND

Depending on vehicles, a side cowl top cover is placed between a front fender and a windshield. Such a structure is disclosed in, for example, JP 2011-98621 A.

The structure disclosed in JP 2011-98621 A will be described below with reference to FIG. 10.

Figure 10:
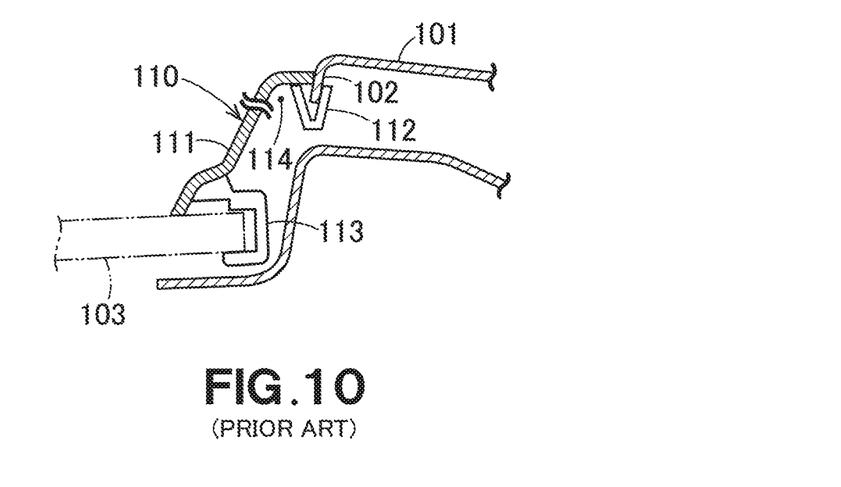
FIG. 10 is a diagram for describing a structure of a conventional side cowl top cover.

As illustrated in FIG. 10, a front fender 101 includes an end flange 102 provided at an end portion and extended downwardly.

A side cowl top cover 110 includes a V-shaped pawl 112 which is provided at an upper portion of a vertical wall 111 and in which the end flange 102 of the front fender 101 can be inserted. The side cowl top cover 110 includes a rectangular pawl 113 which is provided at a lower portion of the vertical wall 111 and which holds the end portion of a windshield 103. The side cowl top cover 110 is a resin-molded member.

The side cowl top cover 110 that employs such a structure is formed using a mold which generally includes a left mold and a right mold. However, an undercut portion 114 is present between the V-shaped pawl 112 and the vertical wall 111. This undercut portion 114 is formed by a different slide-type mold (partial mold) from the left mold or the right mold. Since the undercut portion 114 is opened downwardly, when a product is demolded from the mold, the slide-type mold is moved downwardly.

If the V-shaped pawl 112 and the rectangular pawl 113 are present on the same plane, the slide-type mold collides the rectangular pawl 113.

Hence, according to the structure disclosed in JP 2011-98621 A, the rectangular pawl 113 is placed in the depthwise direction of the figure so as to be sufficiently apart from the V-shaped pawl 112. Since it is sufficiently apart, a movement of the slide-type mold is not interrupted.

Although the shape of the side cowl top cover 110 is becoming more diversified, a structure in which the V-shaped pawl 112 and the rectangular pawl 113 are placed on the same plane is also required. It is difficult for the structure disclosed in JP 2011-98621 A to meet such a requirement. In order to meet this requirement, a side cowl top cover that employs a structure which facilitates designing of a mold and which is capable of enhancing the degree of freedom for designing of the shape of the top cover itself is required.

SUMMARY OF THE INVENTION

An objective of the present disclosure is to provide a side cowl top cover which enhances a degree of freedom for designing of a shape and which facilitates designing of a mold.

A first embodiment of the present disclosure provides a side cowl top cover that is placed between a front fender that includes an end flange bent downwardly, and a windshield that includes an end portion along the front fender, and the side cowl top cover includes:

a cover body; and
a hook formed at an upper portion of the cover body so as to expand in order to be engaged with the end flange, wherein the cover body includes:
a vertical wall that extends upwardly from a lower side of the windshield; and
an extended portion extended from an upper end of the vertical wall toward the front fender,
wherein the hook includes:
a holder placed at a predetermined gap relative to an end face of the extended portion and extended substantially in parallel with the end face of the extended portion; and
a vertical rib extended in a direction intersecting with the direction in which the holder extends, and interconnecting a bottom surface of the extended portion and a bottom surface of the holder.

According to the present disclosure, since the bottom surface of the extended portion and the bottom surface of the holder are substantially on the same plane, and the vertical rib extends in a demolding direction, there is no undercut portion near the bottom surface of the extended portion and that of the holder. Since there is no undercut portion, designing of a mold is facilitated. Moreover, since there is no undercut portion, the vertical wall can be freely formed in any shape.

Therefore, according to the present disclosure, the side cowl top cover which enhances the degree of freedom for designing of a shape and which facilitates designing of a mold.

In addition, since the space between the end face of the extended portion and the holder is completely opened in the vertical direction, rain water does not remain at the hook. If the rain water remains, the remaining water is frozen and expands. When the frozen water expands, the attachment may become improper, but according to the present disclosure, the attachment does not become improper.

Preferably, the vertical rib includes a notch formed at an upper portion of the vertical rib to hold a lower portion of the end flange.

The end flange that is inserted between the end face of the extended portion and the holder is also inserted in the notch of the vertical rib.

The end flange can have the height dimension decided in view of the total of the height dimension of the holder and the height dimension (depth) of the notch, and thus an insertion margin for the end flange to the hook can be increased.

Preferably, the hook includes a horizontal rib that intersects with the vertical rib.

By interconnecting the plurality of vertical ribs by the horizontal rib, the rigidity of the hook can be enhanced.

Preferably, a lower portion of the vertical wall is curved so as to be apart from the windshield.

When the vertical wall has the curved portion, this curved portion can expand the movable range of a windshield wiper. Although the curved portion expands substantially in parallel with the extended portion, there is no undercut portion near the bottom surface of the extended portion and that of the holder. Since there is no undercut portion, the side cowl top cover that includes the curved portion can be easily formed by a mold that moves in the direction in which the curved portion expands.

BRIEF DESCRIPTION OF THE DRAWINGS

Several preferred embodiments of the present disclosure will be described below in detail with reference to the accompanying figures in which.

DETAILED DESCRIPTION OF THE EMBODIMENTS

Embodiments of the present disclosure will be described below with reference to the accompanying figures. Note that front, rear, left, right, up and down sides are defined with reference to a driver.

Figure 1:
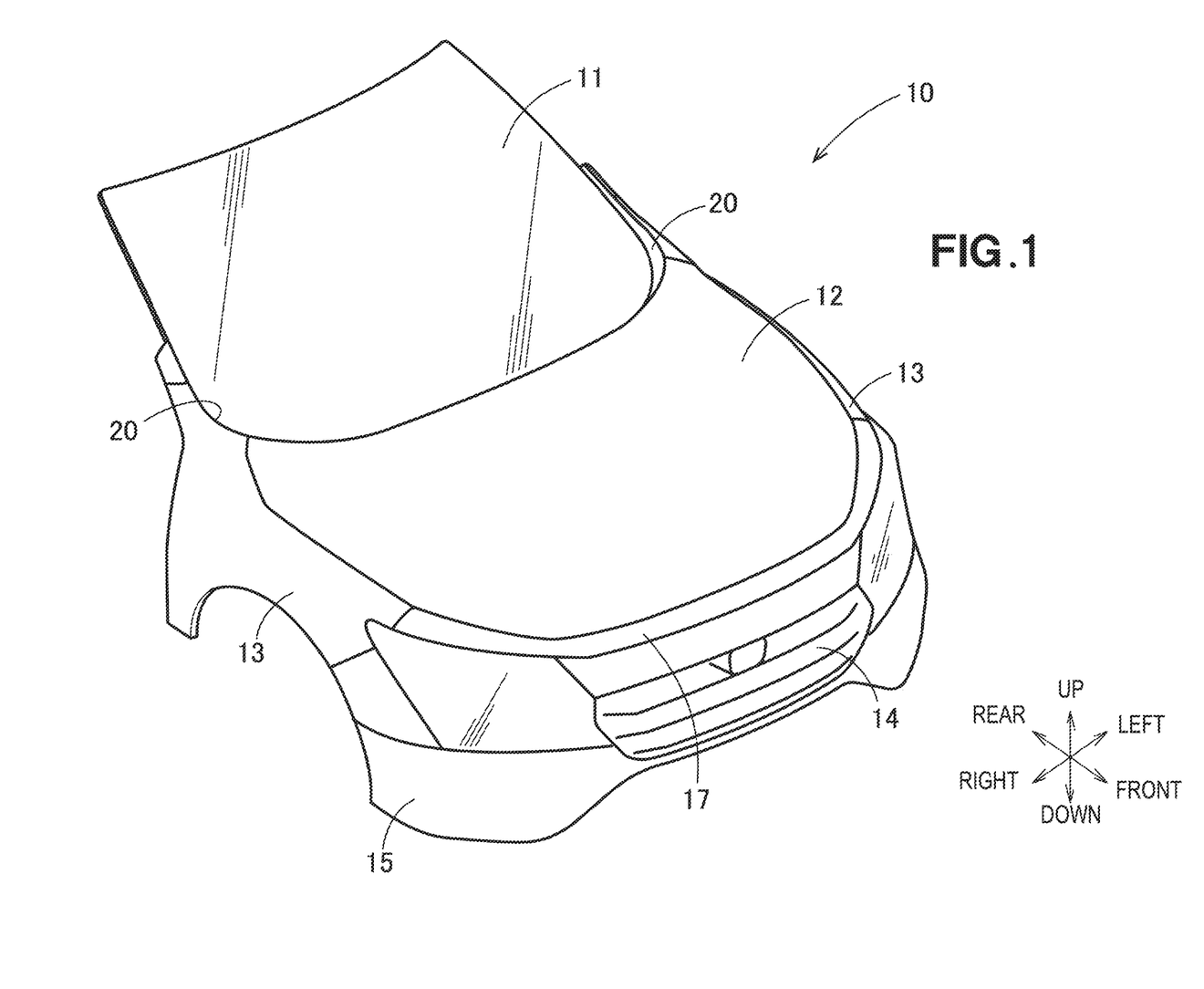
FIG. 1 is a perspective view of a vehicle front section.

As illustrated in FIG. 1, a vehicle 10 includes a windshield 11 that covers a front space of a driver, an engine hood 12 that covers an engine room, right and left front fenders 13 that cover respective front wheels, a grill 14 that covers the front part of the engine room, and a front bumper 15 placed along the lower edge of the grill 14.

Moreover, a garnishment body 17 is placed along the front edge of the engine hood 12.

Furthermore, side cowl top covers 20 are placed along the respective front fenders 13. These side cowl top covers 20 cover the end portions of the windshield 11.

Figure 2:
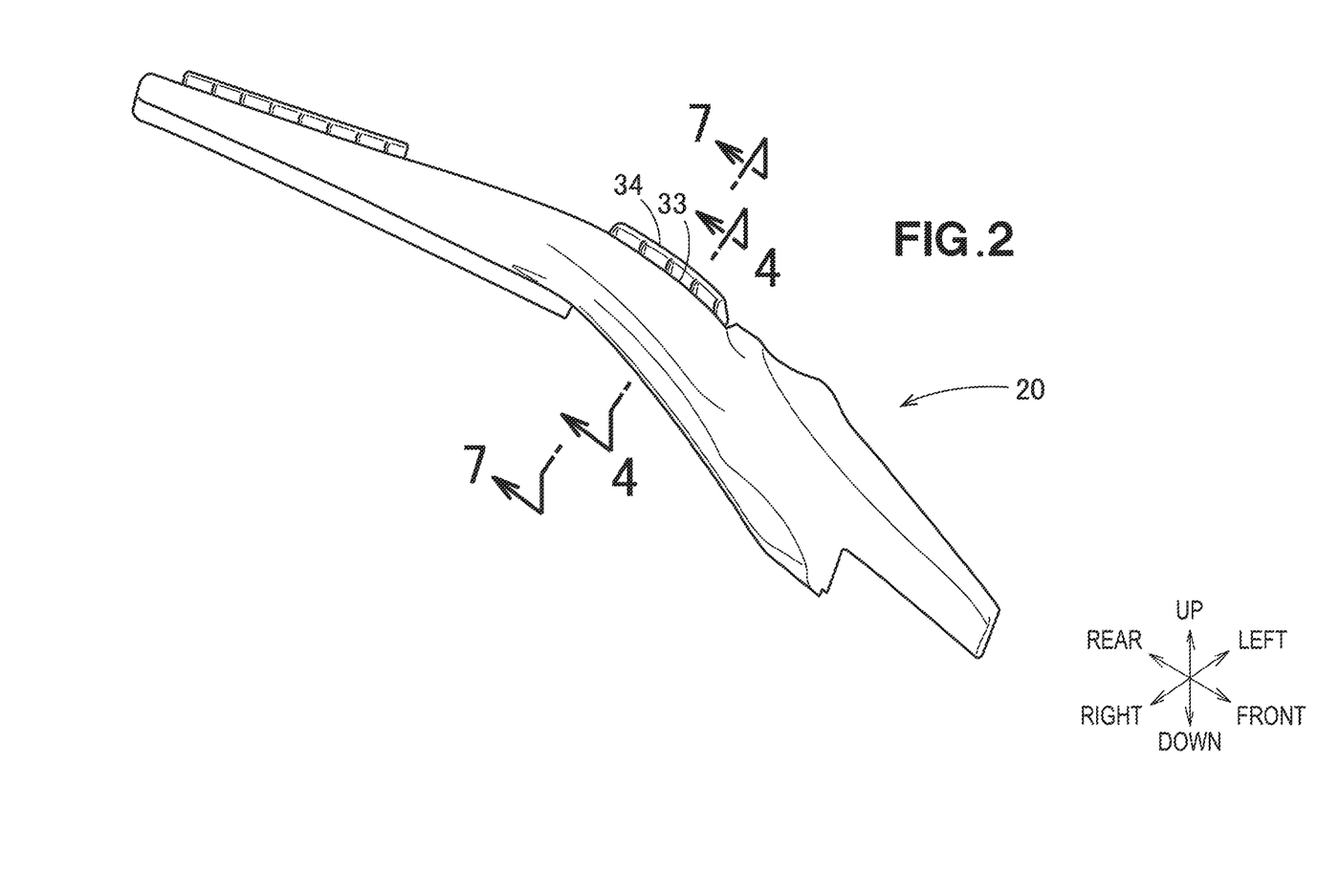
FIG. 2 is a perspective view of a side cowl top cover according to the present disclosure.

As illustrated in FIG. 2, each side cowl top cover 20 is a resin-molded member extended back and forth (a vehicle lengthwise direction).

Figure 3:
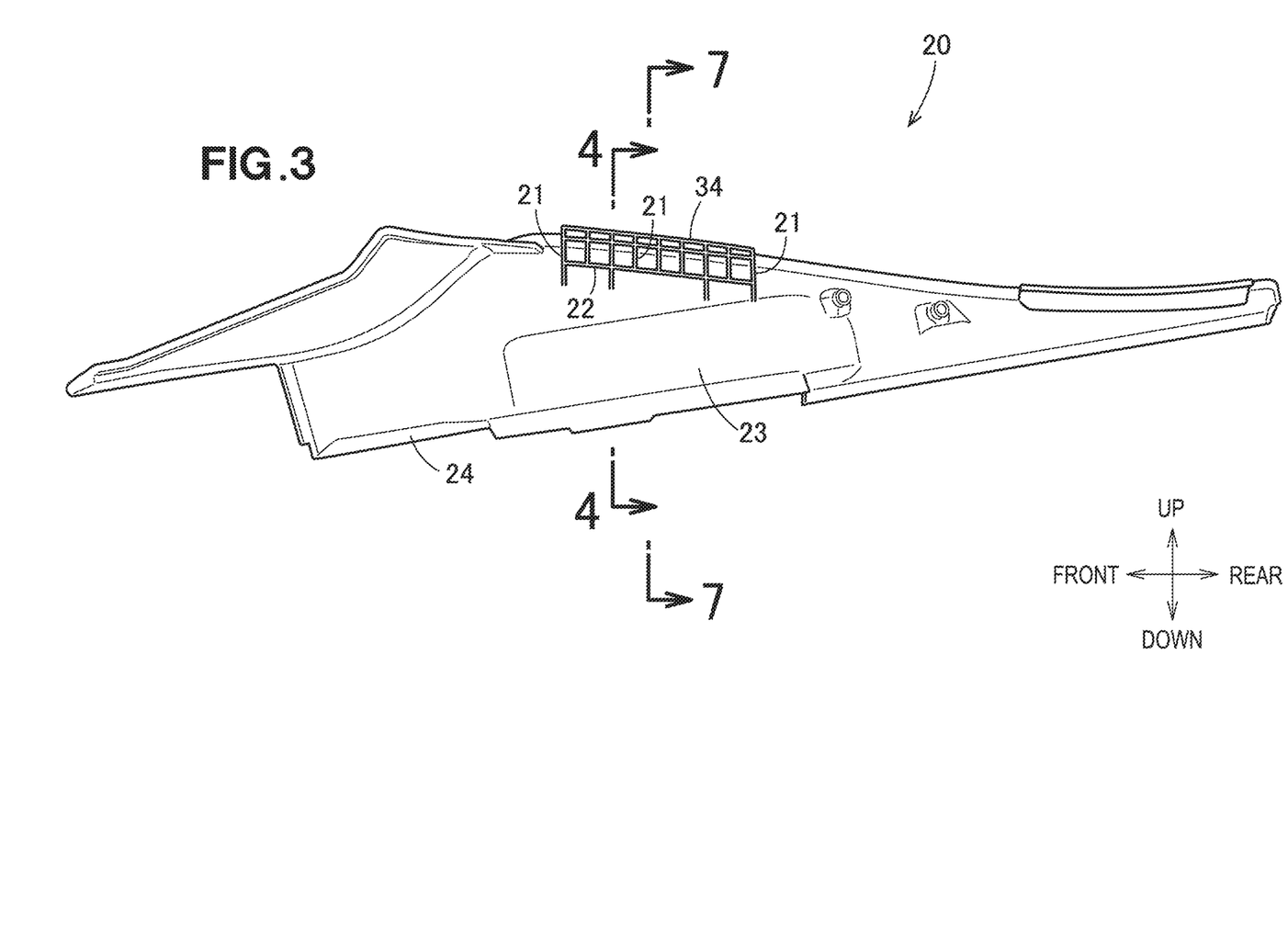
FIG. 3 is a back view of the side cowl top cover.

As illustrated in FIG. 3 that is a back view, a plurality of vertical ribs 21 extended up and down and a plurality of horizontal ribs 22 extended in a front direction to the depthwise direction of the figure(left side direction of FIG. 2) are formed integrally with the side cowl top cover 20. A curved portion 23 that protrudes in the front direction to the depthwise direction of the figure (left side direction of FIG. 2) is provided below the vertical ribs 21, and thus a lip 24 is provided at a lower site.

Figure 7:
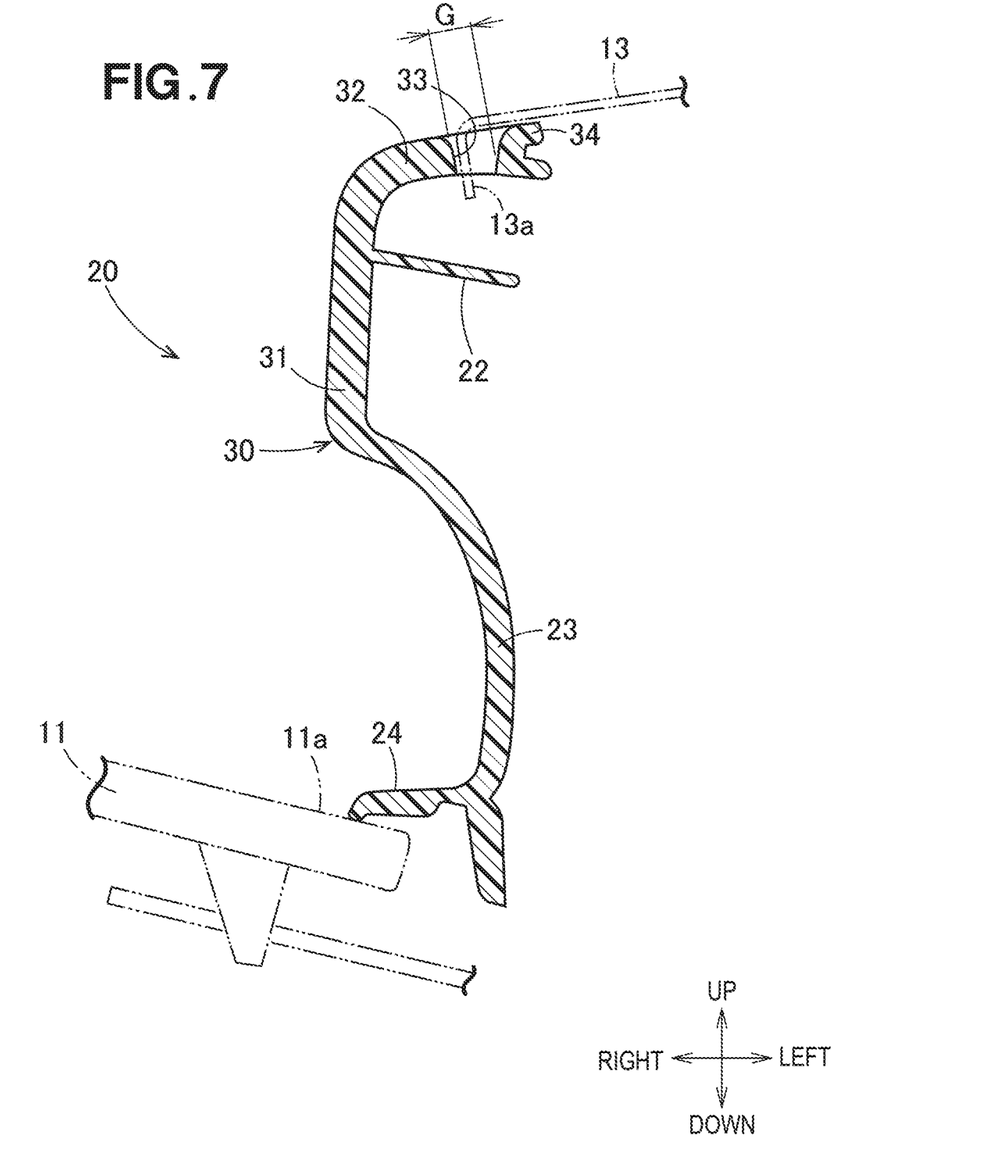
FIG. 7 is a cross-sectional view taken along a line 7-7 in FIGS. 2 and 3.

The plurality of vertical ribs 21 is formed at a predetermined pitch. A cross-sectional view at a portion of the vertical rib 21 is illustrated in FIG. 4A, and a cross-sectional view at a portion where no vertical rib 21 is present is illustrated in FIG. 7.

Figure 4A:
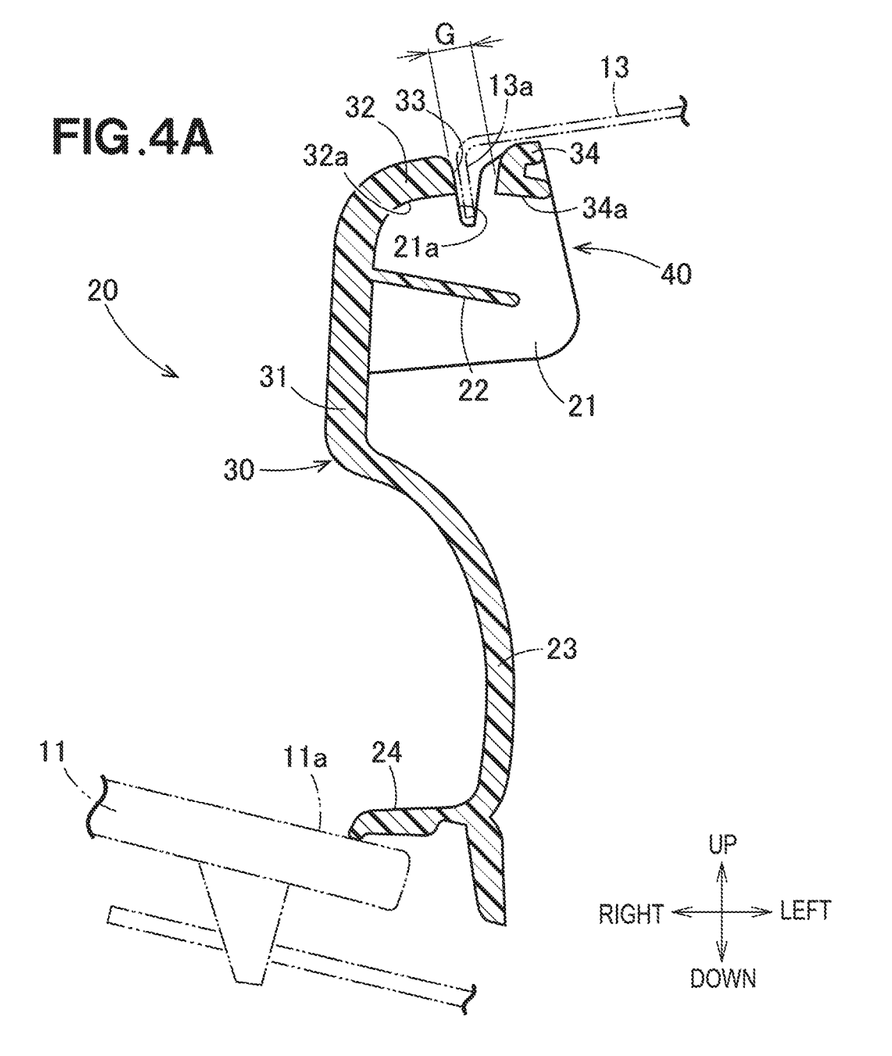
FIG. 4A is a cross-sectional view taken along a line 4-4 in FIGS. 2 and 3, and is a cross-sectional view of the side cowl top cover at a location of a vertical rib.

As illustrated in FIG. 4A, each side cowl top cover 20 is placed between each front fender 13 and the windshield 11.

The front fender 13 includes an end flange 13a that is bent downwardly. The windshield 11 includes an end portion 11a that extends in the depthwise direction of the figure along the front fender 13.

Each side cowl top cover 20 includes a cover body 30, and a hook 40 that is formed at the upper portion of the cover body 30 so as to expand in order to be engaged with the end flange 13a.

Furthermore, the cover body 30 includes a vertical wall 31 extended upwardly from the lower side of the windshield 11, and a short extended portion 32 extended from the upper end of this vertical wall 31 toward the front fender 13.

The hook 40 includes a holder 34 and the vertical ribs 21.

The holder 34 is placed with a predetermined clearance G from an end face 33 of the extended portion 32. The holder 34 is extended substantially in parallel (the depthwise direction of the figure) with the end face 33 of the extended portion 32. The holder 34 has a height dimension corresponding to a height dimension of the end face 33.

Each vertical rib 21 is extended in a direction (a planar direction of the figure) that intersects an extended direction (the depthwise direction of the figure) of the holder 34. The vertical rib 21 connects a bottom surface 32a of the extended portion 32 and a bottom surface 34a of the holder 34.

The hook 40 includes the rectangular vertical ribs 21 and the holder 34 that expands upwardly from portions of these vertical ribs 21 at the front fender 13 side, thus having a substantially L-shaped cross section.

Figure 4B:
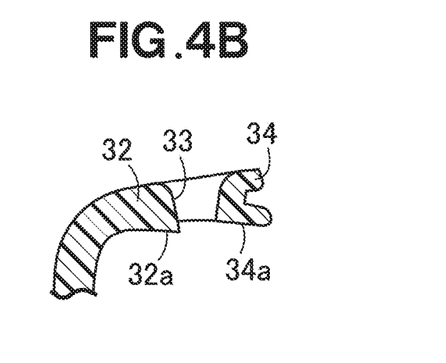
FIGS. 4B and 4C are cross-sectional view for describing a modified example that has the major portion of the side cowl top cover changed.

As illustrated in FIG. 4B, the height dimension of the end face 33 of the extended portion 32 may be increased relative to the height dimension of the holder 34.

Figure 4C:
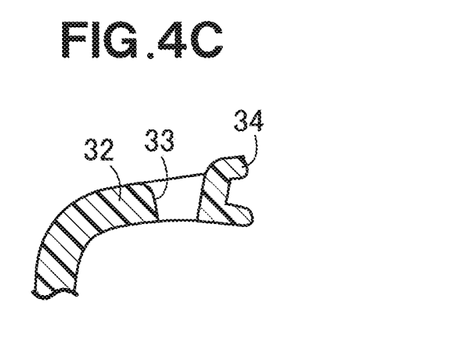

Alternatively, as illustrated in FIG. 4C, the height dimension of the holder 34 may be increased relative to the height dimension of the end face 33 of the extended portion 32.

Preferably, structural elements to be described below are added to the above-described structure.

As illustrated in FIG. 4A, a notch 21a that holds therein the lower portion of the end flange 13a is provided in the upper portion of each vertical rib 21. The notch 21a is not limited to a notch formed by machining, and may include a shape which is similar to a notch and which is formed by resin molding. It is appropriate if the notch 21a should be formed in a V-shape or U-shape, but such a shape is optional.

The notch 21a is not always requisite. When there is no notch 21a, the length (the height dimension) of the end flange 13a is decided in accordance with the height dimension of the end face 33 and that of the holder 34. If an attempt is made to elongate the end flange 13a, a corresponding structural change such as to increase the thickness of the extended portion 32 is necessary.

In this point, when there is the notch 21a, the notch 21a can achieve an insertion margin for the end flange 13a, and thus the extended portion 32 and the holder 34 can be thinned.

Alternatively, it is preferable to add, to the vertical ribs 21, the horizontal ribs 22 which intersect with these vertical ribs 21.

When there is no horizontal rib 22, in view of downward and lateral forces to be applied to the holder 34, it is necessary to thicken the vertical ribs 21 so as to secure the rigidity.

In this point, when there are the horizontal ribs 22, the respective vertical ribs 21 are reinforced by the respective horizontal ribs 22. This reinforcement allows the vertical ribs 21 to be thinned, and thus an increase in weight is prevented, and a sink marks by the ribs can be minimized.

Furthermore, it is desirable that the lower portion of the vertical wall 31 should be formed as the curved portion 23 that is curved so as to be apart from the windshield 11.

By providing the curved portion 23, the movable range for a windshield wiper can be extended.

A resin-molding method for the side cowl top cover 20 that employs the above-described structure will be described with reference to FIGS. 5 and 6.

Figure 5:
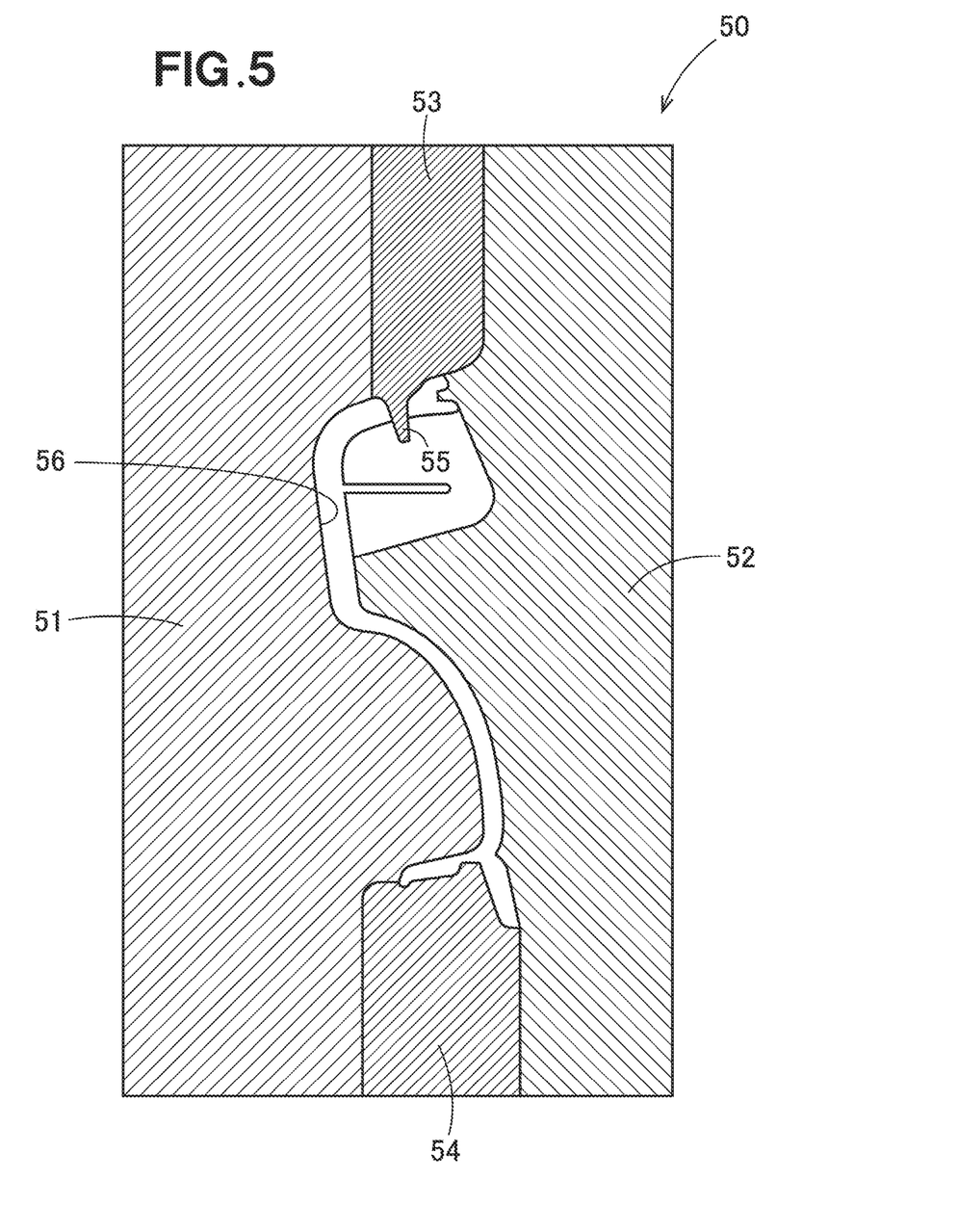
FIG. 5 is a cross-sectional view of a mold corresponding to the cross section taken along the line 4-4.

As illustrated in FIG. 5, the mold 50 includes a stationary mold 51, a movable mold 52, a first slide-type mold 53, and a second slide-type mold 54. The first slide-type mold 53 is provided a tapered portion 55.

A cavity 56 that corresponds to the cross section of the side cowl top cover 20 as illustrated in FIG. 4 is formed in the mold 50.

Figure 6A:
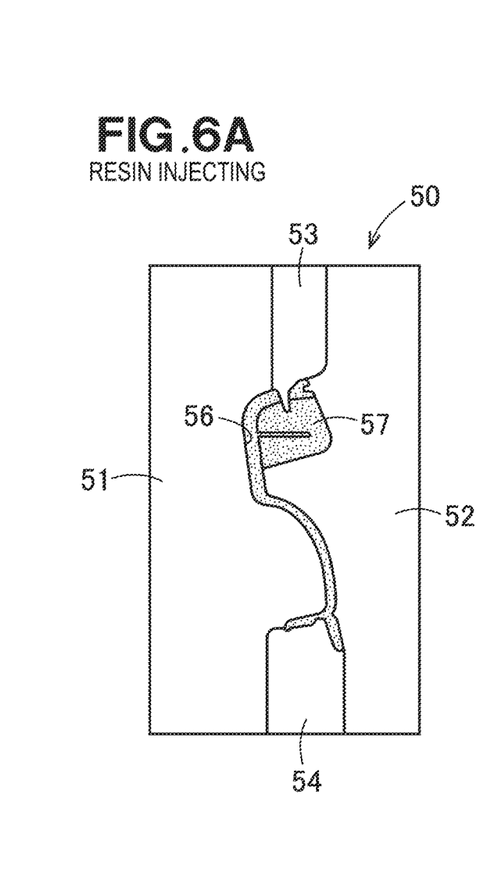
FIGS. 6A to 6C are diagrams for describing a resin molding process.
Figure 6B:
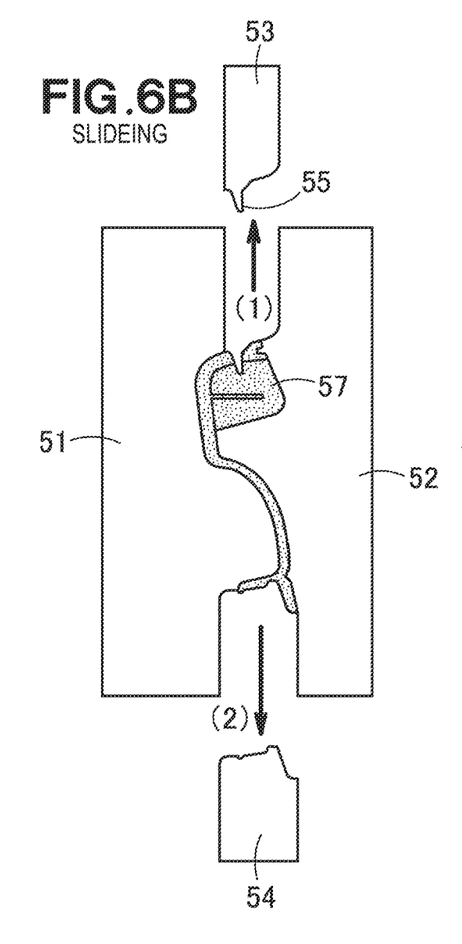
Figure 6C:
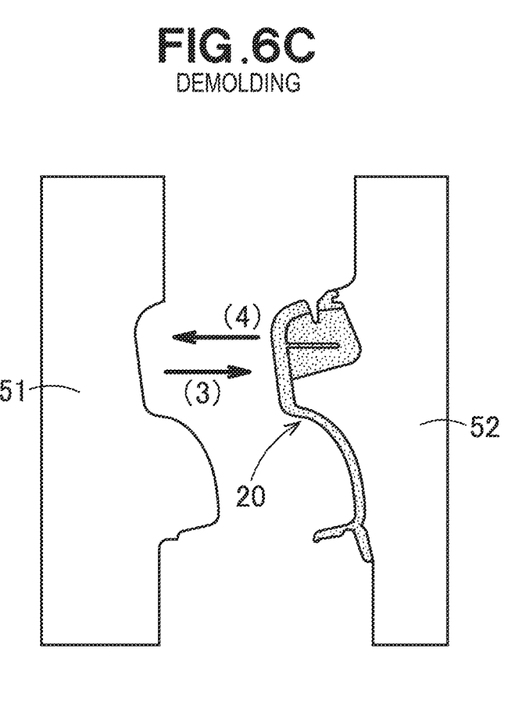

In a resin injecting process illustrated in FIG. 6A, a plasticized resin material 57 is injected to the cavity 56. When the resin material 57 is cured, as illustrated in FIG. 6B, the first slide-type mold 53 is demolded (an arrow (1)), and the second slide-type mold 54 is demolded (an arrow (2)). Next, as illustrated in FIG. 6C, the movable mold 52 is demolded from the stationary mold 51 (an arrow (3)), and then the side cowl top cover 20 is taken out from the movable mold 52 (an arrow (4)).

In FIG. 4, since the bottom surface 32a of the extended portion 32 and the bottom surface 34a of the holder 34 are substantially on the same plane and the vertical ribs 21 are extended in the demolding direction, there is no undercut portion near the bottom surface 32a of the extended portion 32 and the bottom surface 34a of the holder 34. Hence, as illustrated in FIG. 5, the mold 50 can be simplified, facilitating the designing of the mold 50.

Next, a cross section that has no vertical rib 21 will be described with reference to FIGS. 7 to 9.

As illustrated in FIG. 7, the curved portion 23 is provided at the lower portion of the vertical wall 31, the horizontal rib 22 is provided at the upper portion of the vertical wall 31, and the extended portion 32 is provided at the upper portion of the vertical wall 31. The end flange 13a is inserted between the end face 33 of the extended portion 32 and the holder 34.

Since there is no bottom between the end face 33 of the extended portion 32 and the holder 34, rain water hardly remains at this site. The falling rain water flows along the upper surface of the inclined horizontal rib 22, and is drained to the exterior.

Figure 8:
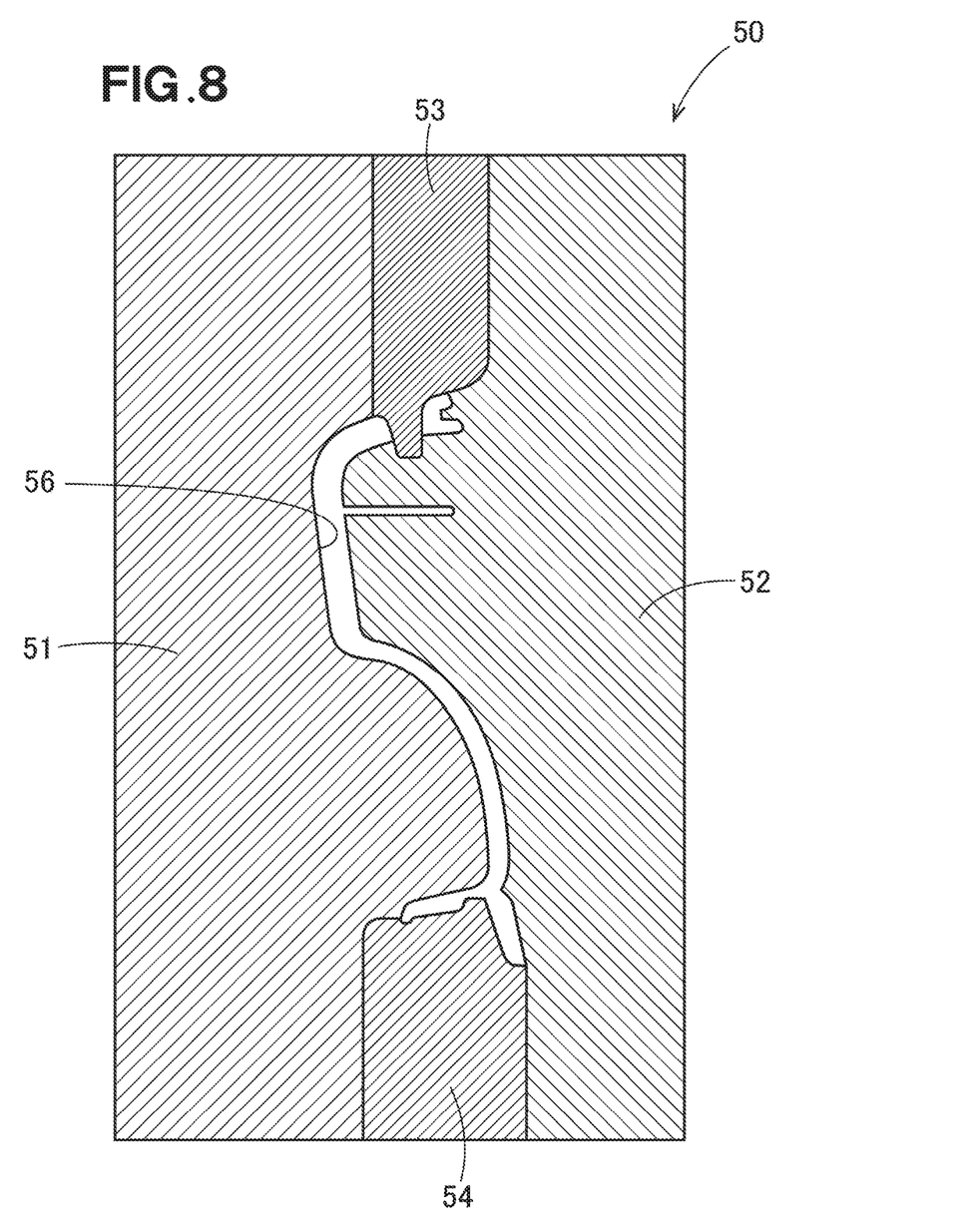
FIG. 8 is a cross-sectional view of the mold corresponding to the cross section taken along a line 7-7.

As illustrated in FIG. 8, the cavity 56 that corresponds to the cross section of the side cowl top cover 20 as illustrated in FIG. 7 is formed in the mold 50 that includes the stationary mold 51, the movable mold 52, the first slide-type mold 53, and the second slide-type mold 54.

Figure 9A:
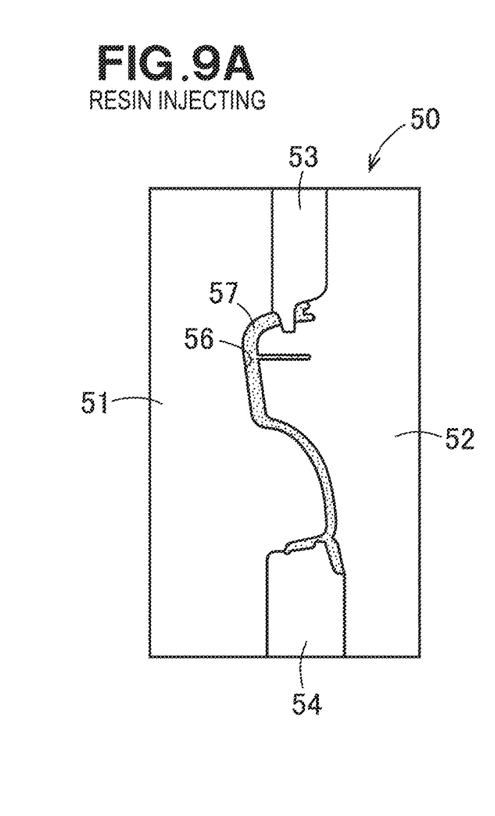
FIGS. 9A to 9C are diagrams for describing a resin molding process.
Figure 9B:
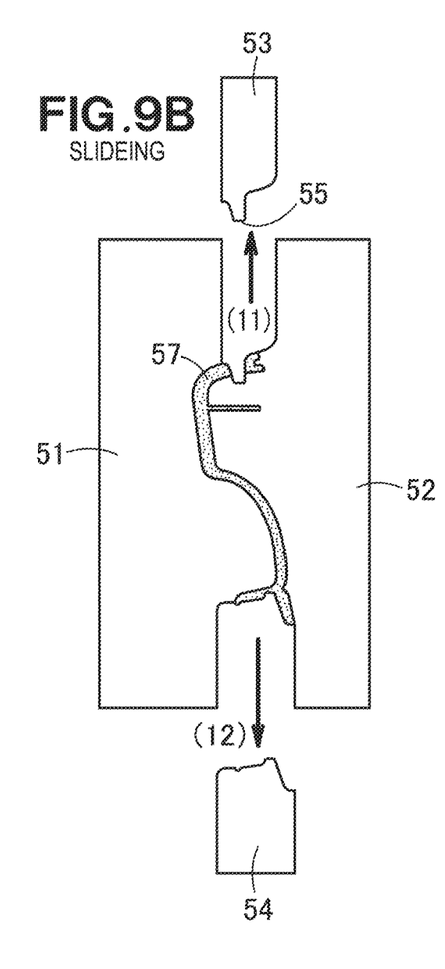
Figure 9C:
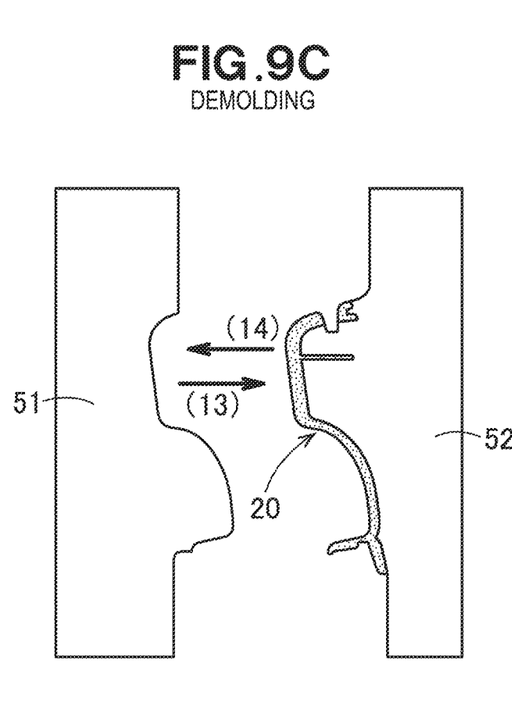

In a resin injecting process illustrated in FIG. 9A, the plasticized resin material 57 is injected to the cavity 56. When the resin material 57 is cured, as illustrated in FIG. 9B, the first slide-type mold 53 is demolded (an arrow (11)), and the second slide-type mold 54 is demolded (an arrow (12)). Next, as illustrated in FIG. 9C, the movable mold 52 is demolded from the stationary mold 51 (an arrow (13)), and then the side cowl top cover 20 is taken out from the movable mold 52 (an arrow (14)).

As described above, according to the present disclosure, since the bottom surface 32a of the extended portion 32 and the bottom surface 34a of the holder 34 are substantially on the same plane as illustrated in FIG. 4, there is no undercut portion near the bottom surface 32a of the extended portion 32, and near the bottom surface 34a of the holder 34. Since there is no undercut portion, even if the curved portion 23 (or a mounting seat, etc.,) is present at the lower portion of the vertical wall 31, the hook 40 can be designed. Since the curved portion 23 (or a mounting seat, etc.,) can be included, the side cowl top cover 20 has an increased degree of freedom for designing of a shape. Moreover, since there is no undercut portion, the mold designing can be facilitated.

Moreover, the structure of the mold 50 is not limited to the embodiment, and can be changed as appropriate.

The present disclosure is suitable for a side cowl top cover for a vehicle.

What is claimed is:

1. A side cowl top cover that is placed between a front fender that comprises an end flange bent downwardly, and a windshield that comprises an end portion along the front fender, the side cowl top cover comprising:
   a cover body; and
   a hook formed at an upper portion of the cover body so as to expand in order to be engaged with the end flange,
   wherein the cover body comprises:
   a vertical wall that extends upwardly from a lower side of the windshield; and
   an extended portion extended from an upper end of the vertical wall toward the front fender,
   wherein the hook comprises:
   a holder placed at a predetermined gap relative to an end face of the extended portion and extended substantially in parallel with the end face of the extended portion; and
   a vertical rib extended in a direction intersecting with the direction in which the holder extends, and interconnecting a bottom surface of the extended portion and a bottom surface of the holder;
   wherein the vertical rib comprises a notch formed at an upper portion of the vertical rib to hold a lower portion of the end flange.

2. The side cowl top cover according to claim 1, wherein the hook comprises a horizontal rib that intersects with the vertical rib.

3. The side cowl top cover according to claim 1, wherein a lower portion of the vertical wall is curved so as to be apart from the windshield.

* * * * *